United States Patent
Bahel et al.

[11] Patent Number: 5,311,748
[45] Date of Patent: May 17, 1994

[54] CONTROL SYSTEM FOR HEAT PUMP HAVING DECOUPLED SENSOR ARRANGEMENT

[75] Inventors: Vijay Bahel, Sidney; Hank Millet, Piqua; Mickey Hickey, Sidney; Hung Pham, Dayton; Gregory P. Herroon, Piqua, all of Ohio

[73] Assignee: Copeland Corporation, Sidney, Ohio

[21] Appl. No.: 928,892

[22] Filed: Aug. 12, 1992

[51] Int. Cl.$^5$ .............................................. F25B 41/04
[52] U.S. Cl. ........................................ 62/160; 62/211; 62/223
[58] Field of Search ................. 62/160, 210, 211, 212, 62/222, 223, 224, 225, 204

[56] References Cited

U.S. PATENT DOCUMENTS

| | | | |
|---|---|---|---|
| 2,060,589 | 11/1936 | Otto | 62/211 X |
| 2,112,344 | 3/1938 | Otto | 62/211 X |
| 4,112,703 | 9/1978 | Kountz | 62/211 |
| 4,165,619 | 8/1979 | Girard | 62/99 |
| 4,244,182 | 1/1981 | Behr | 62/211 |
| 4,333,317 | 6/1982 | Sawyer | 62/212 |
| 4,448,038 | 5/1984 | Barbler | 62/212 |
| 4,467,613 | 8/1984 | Behr et al. | 62/115 |
| 4,495,779 | 1/1985 | Tanaka et al. | 62/211 |
| 4,498,310 | 2/1985 | Imanishi et al. | 62/211 |
| 4,499,739 | 2/1985 | Matsuoka et al. | 62/212 |
| 4,523,435 | 6/1985 | Lord | 62/212 |
| 4,523,436 | 6/1985 | Schedel et al. | 62/222 |
| 4,617,804 | 10/1986 | Fukushima et al. | 62/212 |
| 4,620,424 | 11/1986 | Tanaka et al. | 62/222 |
| 4,674,292 | 6/1987 | Ohya et al. | 62/223 |
| 4,706,469 | 11/1987 | Oguni et al. | 62/222 |
| 4,745,767 | 5/1988 | Ohya et al. | 62/211 |
| 4,768,348 | 9/1988 | Noguchi | 62/225 |
| 4,807,445 | 2/1989 | Matsuoka et al. | 62/212 |
| 4,835,980 | 6/1989 | Oyanagi et al. | 62/212 |
| 4,845,956 | 7/1989 | Berntsen et al. | 62/225 |
| 4,848,099 | 7/1989 | Beckey et al. | 62/212 |
| 4,848,100 | 7/1989 | Barthel et al. | 62/212 |
| 4,893,480 | 1/1990 | Matsui et al. | 62/225 |
| 5,000,009 | 3/1991 | Clanin | 62/115 |
| 5,077,983 | 1/1992 | Dudley | 62/228.1 |

FOREIGN PATENT DOCUMENTS 0052957  2/1990  Japan ....................... 62/223

OTHER PUBLICATIONS

Itoh, H. "Improvement of a Heat Pump Room Air-Conditioner by Use of Pulse-Motor-Driven Expansion Valve," Paper No. 2944, pp. 164–172.

Primary Examiner—Harry B. Tanner
Attorney, Agent, or Firm—Harness, Dickey & Pierce

[57] ABSTRACT

Refrigerant is metered through the expansion valve based on compressor discharge temperature and ambient air temperature measurements. The microprocessor-based control system selects the appropriate stepper motor valve setting to achieve optimal performance. The temperature measurements used in the control system are decoupled from fluctuations due to shifting of the refrigerant dry out point. This allows the system to be operated at much lower superheat temperatures than heretofore attained, yielding improved performance and longer component life.

11 Claims, 8 Drawing Sheets

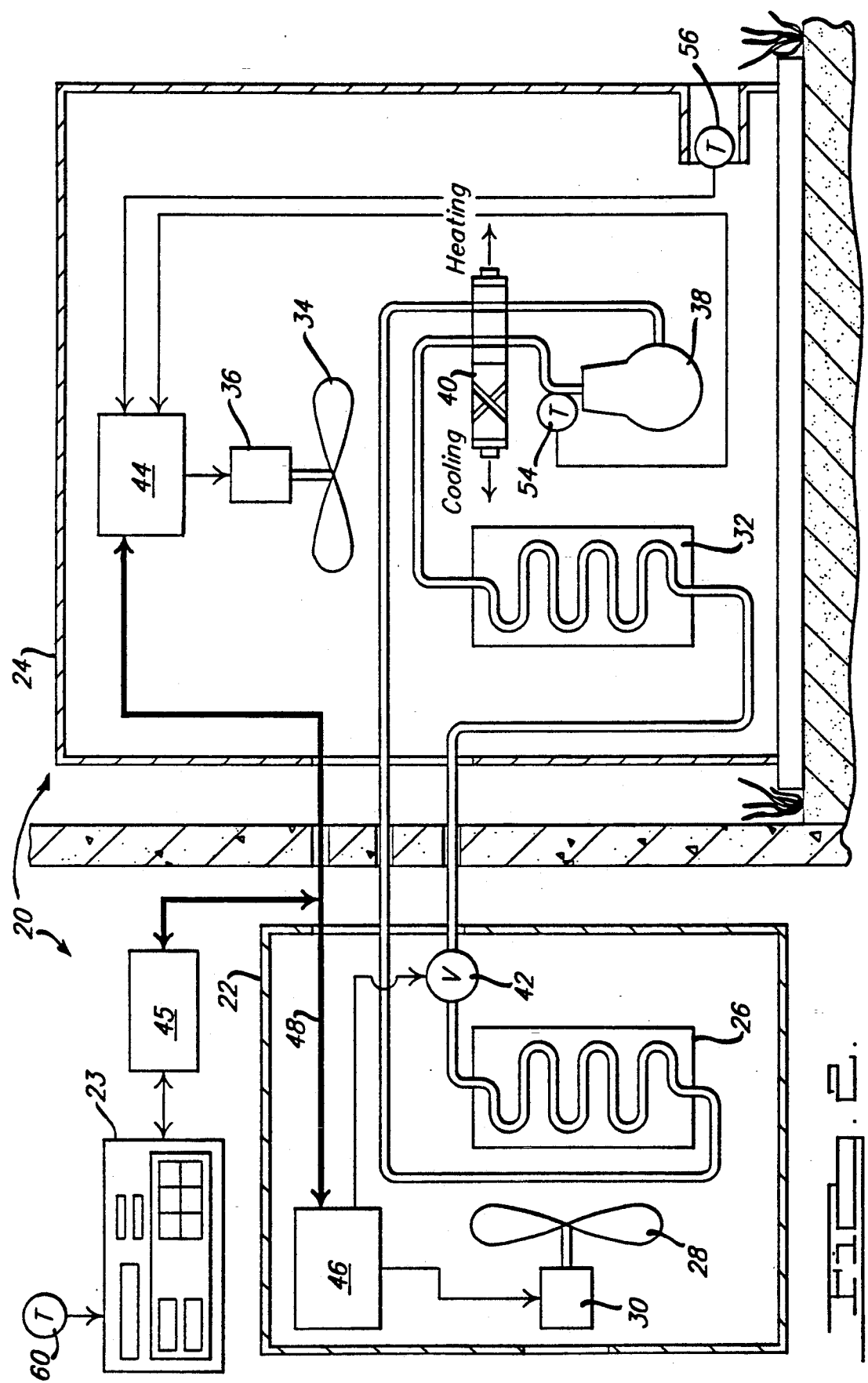

CONTROL SYSTEM FOR HEAT PUMP HAVING DECOUPLED SENSOR ARRANGEMENT

BACKGROUND AND SUMMARY OF THE INVENTION

The present invention relates generally to electronic control systems for air conditioners, heat pumps and refrigeration equipment. More particularly, the invention relates to an apparatus and method using digital circuitry for controlling the flow of refrigerant through the refrigeration system to optimize efficiency and extend component life.

Air conditioning systems, heat pump systems and refrigeration equipment use a considerable amount of electrical energy. Every year more and more owners of residential and commercial buildings will add central air conditioning and heat pump systems. As demand for energy climbs and as energy becomes more costly, it is expected there will be a considerable emphasis placed on improving the efficiency of the refrigeration cycle.

One area which appears promising is to improve the manner in which refrigerant is metered through the system. The refrigerant cools by evaporation in a heat exchanger commonly called an evaporator coil. The refrigerant is metered to the evaporator coil through an orifice sometimes called an expansion valve. Ideally a refrigeration system should meter just enough refrigerant into the evaporation coil, so that the refrigerant extracts heat throughout the entire length of the coil as it evaporates. Due to the changing dynamics of the system, changes in thermostat setting, changes in load from sun, wind and so forth, the optimal performance is not always easy to achieve.

For example, when the temperature surrounding the evaporator coil is high, refrigerant is rapidly converted from the liquid phase to the gaseous phase and there may not be enough refrigerant in the liquid phase to fill the entire evaporator coil. When this occurs, efficiency suffers, since, in effect, some of the evaporator coil is being wasted. On the other hand, if the temperature surrounding the evaporator coil is low, there may not be enough heat present to cause all of the refrigerant to evaporate from the liquid phase to the gaseous phase When this occurs, liquid refrigerant may enter the compressor, degrading efficiency and possibly damaging the compressor. Conventional refrigeration systems have employed a number of different control schemes for metering the refrigerant into the evaporator coil. Although purportedly successful to some degree, there still remains a great deal of room for improvement.

The present invention addresses this problem through the use of a microprocessor-based control system and digitally controlled valve. Precise metering of refrigerant is made possible by a decoupled sensing arrangement which is virtually immune from previously troublesome errors caused by changing system dynamics. The system is able to maintain efficient operation at low temperature levels not heretofore readily attained.

The result is a state-of-the-art air conditioning or heat pump system which offers high efficiency and greater comfort. Because the flow of refrigerant is controlled accurately, the likelihood of introducing liquid-phase refrigerant into the compressor is greatly reduced. This results in longer compressor life.

For a more complete understanding of the invention, its objects and advantages, reference may be had to the following specification and to the accompanying drawings.

BRIEF DESCRIPTION OF THE DRAWINGS

FIG. 2 is a schematic diagram of a preferred embodiment of the refrigeration control system of the invention, illustrated in a heat pump application;

DESCRIPTION OF THE PREFERRED EMBODIMENT

The present invention provides an apparatus and method for optimizing the refrigeration cycle employed in air conditioners, heat pumps and refrigeration equipment. The system employs a microprocessor-based control system with a unique complement of sensors and an electronically controlled expansion valve to optimally control the system superheat. To illustrate the principles of the invention, a heat pump system capable of providing both heating and cooling will be described. A heat pump system of the type described might be suitable for heating and cooling a commercial or residential building, although the principles of the invention are not limited to commercial and residential heating and cooling and are applicable to all pumped heat transfer systems.

Figure 1:
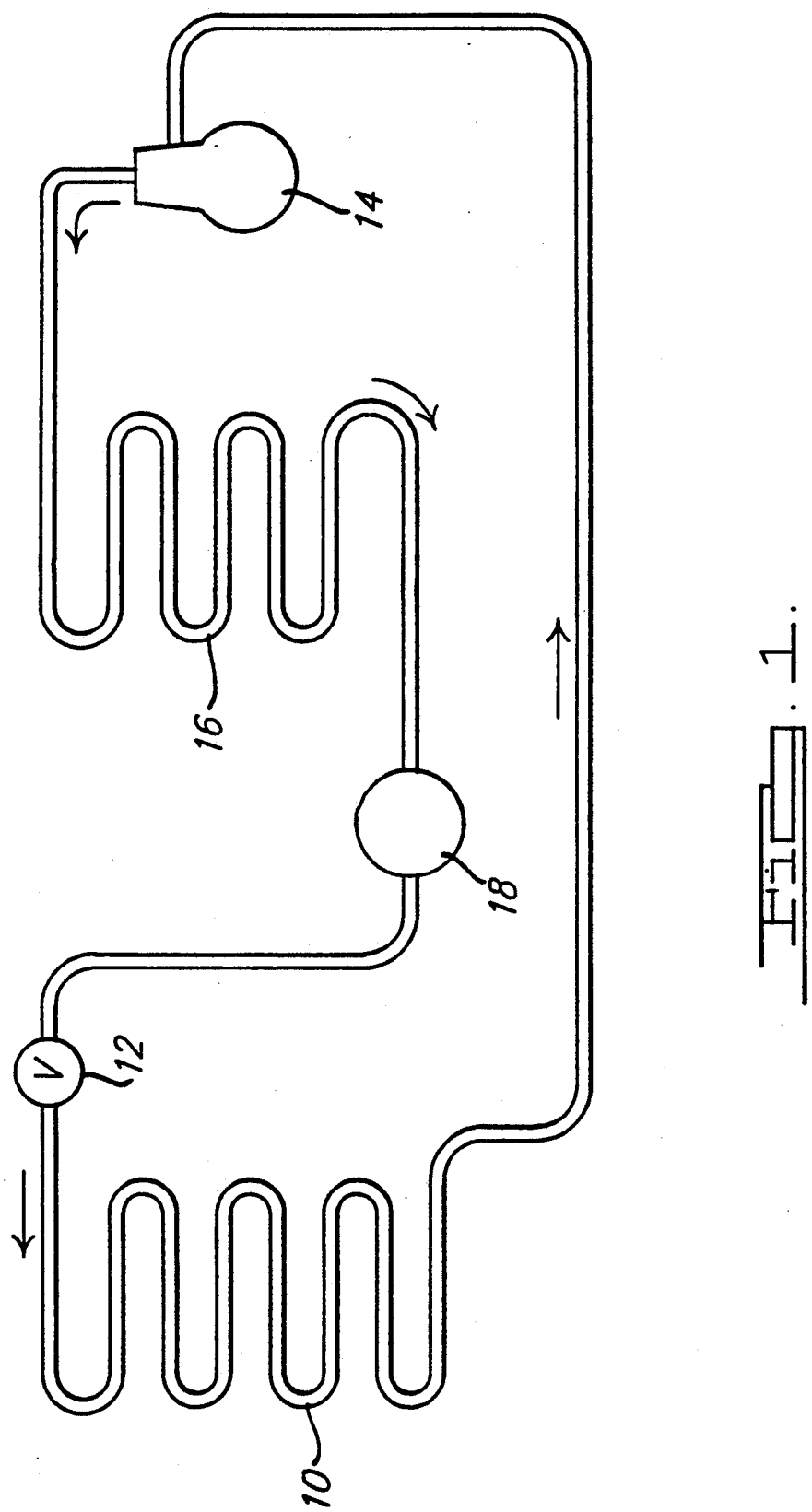
FIG. 1 is a schematic representation of the basic refrigeration cycle.

However, before giving a detailed description of the presently preferred embodiment, a brief review of the refrigeration cycle will be given. That cycle will be described in connection with a basic cooling system illustrated schematically in FIG. 1.

The refrigeration cycle uses the cooling effect of evaporation to lower the temperature or "air condition" the surroundings. This is accomplished by releasing a refrigerant under pressure (usually in the liquid phase) into a low pressure region to cause the refrigerant to expand into a low temperature mixture of gas and liquid. Commonly, this low pressure region comprises an evaporator coil, such as evaporator coil 10. The refrigerant mixture once in the evaporator coil 10 is exposed to the high temperature ambient air of the region desired to be cooled. Evaporation of refrigerant from liquid to gas absorbs heat from the ambient air and thereby cools it. A fan or blower (not shown) is often used to circulate the ambient air and force it into more rapid contact with the cool evaporator coil to increase heat transfer. The refrigerant is able to evaporate or boil in the evaporator coil because of the lower pressure. In making the transition from liquid to gas, latent heat of vaporization is extracted from the ambient air.

The release of refrigerant into the low pressure evaporator coil is usually metered by a restricted orifice or valve commonly called an expansion valve 12. There are a wide variety of different types of expansion devices in use today, ranging from simple nonadjustable capillary tubes to electrically adjustable valves such as pulse width modulated valves.

Were there an endless supply of refrigerant under pressure available to be expanded in the evaporator coil and if such refrigerant could then be safely exhausted to atmosphere, a refrigeration system would require only an evaporator coil in order to function. However, since there are few convenient sources of refrigerant under pressure which can be used and then exhausted to atmosphere, the basic refrigeration system also includes a recovery system which gathers the refrigerant at the outlet of the evaporator coil, compresses it back into a high pressure state and condenses it into a liquid phase to be used once again.

Thus the basic refrigeration cycle routes the gaseous refrigerant from the outlet of the evaporator coil to a compressor 14 which compresses the gaseous refrigerant, placing it at a substantially higher pressure, and raising its temperature. The high pressure, high temperature refrigerant, still in the gaseous phase, is then fed to a heat removal system where the high pressure refrigerant gas is allowed to condense into the liquid phase.

Ordinarily this heat removal system comprises another coil called the condenser coil 16. By locating the condenser coil in an ambient condition at a temperature lower than the temperature of the pressurized refrigerant, heat is extracted from the refrigerant, cooling it sufficiently to cause a transition to the liquid phase. From the outlet of the condenser coil, the liquid refrigerant may be stored in an optional liquid receiver tank 18 and thereafter recycled back to the expansion valve to begin the cycle once again.

The expansion of refrigerant in the evaporator coil from the liquid phase to the gaseous phase does not occur instantaneously. If one were to examine the interior of an evaporator coil 10 when the refrigeration cycle is operating, one would find at the inlet end (adjacent the expansion valve) some refrigerant would be in the gaseous phase and some would be in the liquid phase. As the refrigerant travels through the coil, more and more of it boils or evaporates into the gaseous phase, leaving less and less of it in the liquid phase.

At some point (possibly within the coil or possibly beyond the coil outlet in the line leading to the compressor) the refrigerant will have finally completely evaporated to the gaseous phase. This point is called the dry out point. The dry out point is important because it marks the point at which the refrigerant can be elevated to a temperature above the saturation temperature or boiling temperature. This elevation above the saturation temperature is called superheating.

To understand superheating one must recognize that in an enclosed system, such as in the evaporator coil, at constant pressure, a boiling liquid will remain at a constant boiling temperature so long as there is some liquid remaining in the system. The boiling temperature is, of course, pressure dependent as dictated by thermodynamic laws. However, once all of the liquid refrigerant has boiled away, the gaseous refrigerant is now potentially able to absorb additional heat to increase in temperature above the boiling temperature.

When the gaseous refrigerant is in contact with liquid refrigerant, it is commonly said to be in the saturated state. In the saturated state the temperature of the gaseous refrigerant is the same as boiling temperature. Once all of the liquid has boiled away and if additional heat is added to elevate the temperature of the vapor above the boiling temperature, then the vapor is said to be superheated. The term superheat is used to denote the temperature difference between the vapor temperature and the saturation temperature (boiling point temperature).

By measuring the superheat of the refrigerant exiting the evaporator coil it is possible to acquire some understanding of how efficiently the refrigeration system is functioning. For example, if no superheat is achieved, then one can infer that the refrigerant is not fully evaporating in the evaporator coil. This, high concentration of liquid phase refrigerant in the outlet of the evaporator implies that liquid refrigerant could be fed to the compressor, a condition which greatly deteriorates compressor efficiency and can even cause compressor damage.

On the other hand, an excessively high superheat value implies that the evaporator coil could have accommodated more refrigerant, again an indicator of reduced efficiency. A design objective of a refrigeration control system is to meter precisely the right amount of refrigerant so that the entire length of the evaporator coil is used without flooding the coil with excessive refrigerant that may get passed to the compressor as liquid.

Having reviewed the basic principles of the refrigeration cycle, a presently preferred embodiment of the invention will be given. Although the invention can take many forms, it will be described in the heat pump system of FIG. 2.

With reference to FIG. 2, the heat pump system is depicted generally at 20. The system includes an indoor unit 22, a room unit or thermostat unit 23 and an outdoor unit 24. The indoor unit includes an indoor coil or heat exchanger 26 and an indoor fan 28. The indoor fan is preferably driven by a variable speed motor 30. The indoor fan and coil are situated using suitable duct work so that the fan forces ambient indoor air across the indoor coil at a rate determined by the speed of the variable speed motor.

The outdoor unit includes an outdoor coil or heat exchanger 32 and an outdoor fan 34 driven by suitable motor 36. Preferably the outdoor unit comprises a protective housing which encases the outdoor coil and outdoor fan so that the fan will draw ambient outdoor air across the outdoor coil to improve heat transfer. The outdoor unit also houses compressor 38.

The system illustrated in FIG. 2 is a so-called "heat pump" system because it can be used for both cooling and heating, by simply reversing the function of the indoor coil and the outdoor coil. This is done with a four-way reversing valve 40. Referring to FIG. 2, when the four-way valve is set to the COOLING position (shown), the indoor coil functions as the evaporator coil and the outdoor coil functions as the condenser coil. When the four-way valve is switched to the HEATING position (the alternate position), the function of the coils is reversed. The indoor coil functions as the condenser and the outdoor coil functions as the evaporator.

In addition to the indoor and outdoor coils and the compressor, the present system also uses an electronically controllable expansion valve 42. In the presently preferred embodiment the expansion valve is a continuously variable (or incrementally variable) stepper motor valve which can be adjusted electronically to a wide range of orifice sizes or valve openings, ranging from fully open to fully closed. Although it is possible to implement the control system of the invention with other types of electrically controlled valves, pulse width modulated valves being an example, the present embodiment prefers the stepper motor valve because it provides ripple-free operation and because it is more trouble-free. The stepper motor valve only needs to move or cycle when an orifice size adjustment is made. This may happen several times during a typical operating sequence (e.g., several times per hour). In contrast, the pulse width modulated valve cycles continuously during the entire operating sequence.

The presently preferred control system is a microprocessor-based system which gathers data from various sensors and which determines the proper setting of the expansion valve based on the data gathered. More specifically, the presently preferred embodiment uses three microprocessor-based control units 44, 45 and 46. Control unit 44 is associated with the outdoor unit 24 and control unit 46 is associated with the indoor unit 22. In addition, the room unit or thermostat unit 23 may also include a microprocessor-based control unit 45. Preferably, all three microprocessor-based control units are linked together via a suitable communication link 48 such as a parallel or serial communication link. The outdoor control unit 44 is largely responsible for data collection while the indoor control unit 46 is responsible for: on/off cycling of system, modulating the indoor fan speed, control of expansion valve, start/termination of demand defrost malfunction detection and performing system diagnostic functions.

Arriving at the proper setting for the expansion valve is not as simple as it might first appear. It is customary to control the expansion valve based on the superheat condition within the evaporator coil. As explained above superheat is a measure of system efficiency and can therefore be used as a control parameter. Superheat is a differential parameter representing the temperature difference or temperature elevation of the refrigerant above the saturation or boiling temperature. Being a differential parameter, superheat requires the measurement of two values in order for it to be determined.

Using thermodynamic laws, superheat can be calculated if one knows both the pressure and the temperature at the outlet of the evaporator coil. Compared with temperature sensors, pressure sensors are quite expensive. Hence most conventional systems determine superheat by measuring temperature at two different points (e.g., at the inlet and at the outlet of the evaporator coil). The conventional system dispenses with the pressure sensor and makes the assumption that the pressure at both temperature measurement points is the same (often an erroneous assumption). By subtracting the two measured temperatures, a superheat value is thus derived.

While simple, this conventional technique is not accurate. As previously explained, the position within the evaporator coil at which dry out occurs tends to migrate unpredictably during the normal refrigeration cycle. The movement of the dry out point seriously degrades the reliability of conventional temperature-temperature measurements.

To illustrate, consider the case in which the dry out point occurs somewhere in the midsection of the evaporator coil, far upstream of the exit temperature sensor. In this case a high superheat value will be measured, since the exit temperature sensor will be reading the temperature of a superheated vapor which has been permitted to rise in temperature from the midsection to the exit. In contrast, if the dry out point occurs downstream of the exit temperature sensor, then no superheat will be measured because the temperature sensor would in that case be exposed to a vapor in saturation.

Figure 3A:
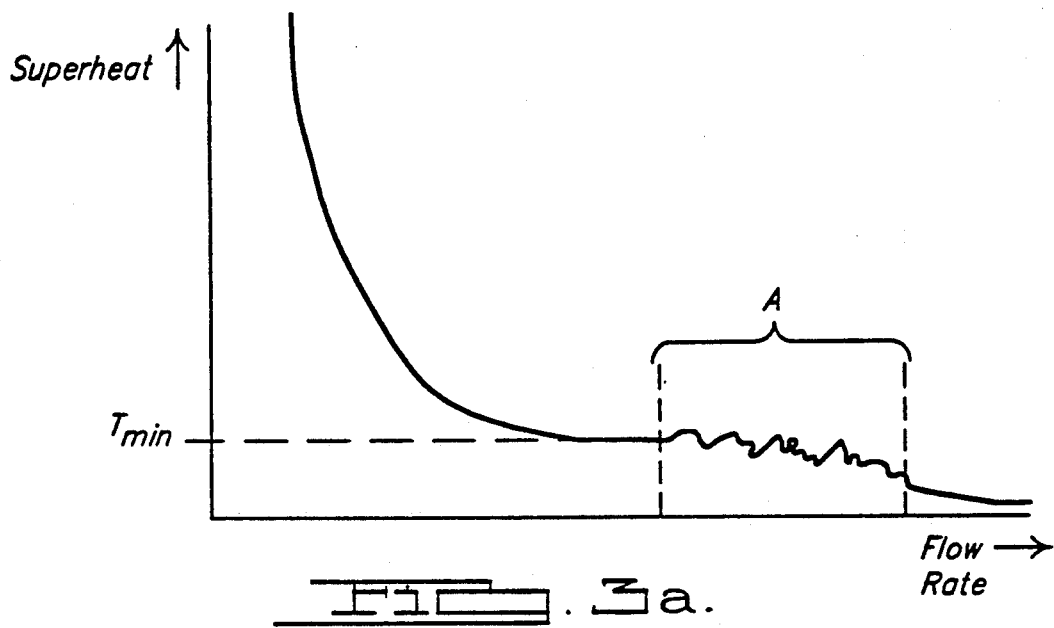
FIGS. 3a and b are graphs depicting the relationship between compressor superheat and compressor discharge temperature, illustrating the minimum stable superheat and unstable regions.
Figure 3B:
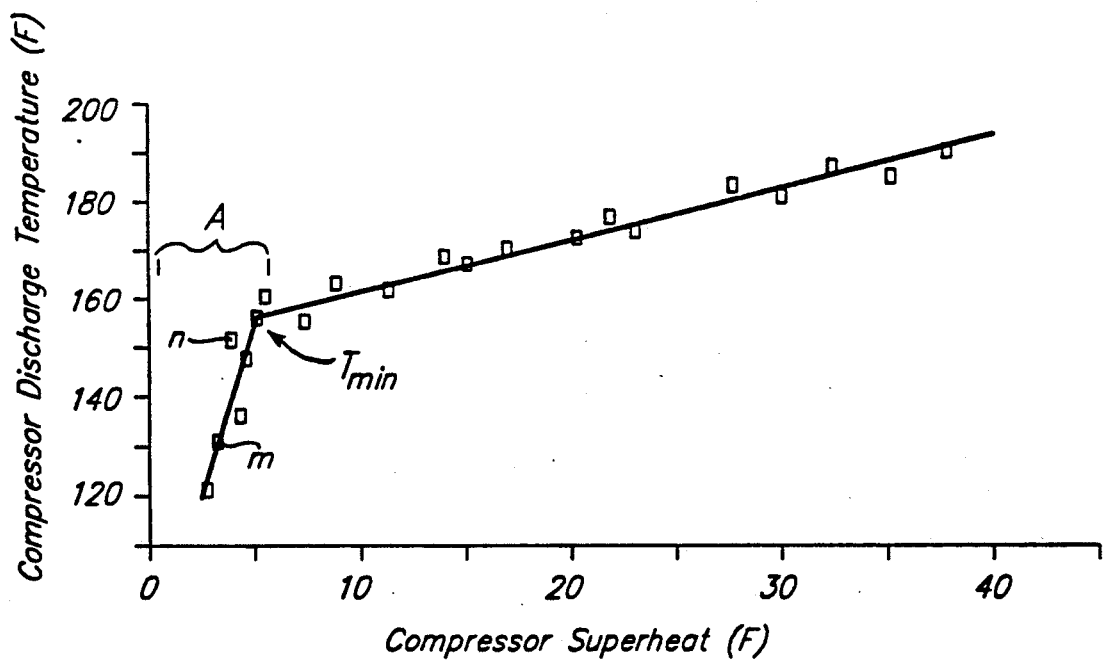

Assuming a conventional system in which the temperature sensors are at two fixed locations on the evaporator coil, e.g. at the inlet and at the exit, FIGS. 3a and 3b show how superheat varies as a function of the quantity or flow of refrigerant introduced through the expansion valve. At a low flow rate, little refrigerant is introduced, dry out occurs early and the superheat value is high. At a certain high flow dry out does not occur, the system remains saturated, and superheat is zero. Due to fluctuations in the system and movement of the dry out point, there is an unstable region, designated at A in FIG. 3a in which the superheat is unpredictable. Being unpredictable, the conventional control system is constructed to avoid the unstable region by selecting a minimum stable superheat value ($T_{min}$ in FIG. 3a) which avoids the unstable region. This minimum stable superheat value might be on the order of 10° to 20°, for example. Typically the unstable region corresponds to a superheat value in the neighborhood of 5°.

FIG. 3b is another depiction of how the minimum stable superheat value $T_{min}$ may be arrived at. FIG. 3b is a graph of compressor discharge temperature as a function of compressor superheat. Both axes are plotted in degrees Farhenheit. The graph has been drawn using empirically determined measurements, shown as rectangular boxes or datapoints on FIG. 3b. At temperatures above approximately 5° superheat the plotted curve shows a substantially straight line having a gently rising slope (approximately 0.9). In contrast, at temperatures below 5° superheat the datapoints are quite scattered over a wide compressor discharge temperature range (compare datapoint m with datapoint n). In addition, the slope of the curve in this region is quite steep (slope approximately 15.2). Based on this empirically determined data the minimum stable superheat value $T_{min}$ is established at the corner or knee where the slope changes between shallow and steep. Preferably the system is designed to operate at or slightly above $T_{min}$ in order to avoid the unstable region designated at A.

The net effect of this unstable region is to force the conventional control system to operate at a higher target superheat value. This is done to ensure that the exit temperature sensor will not be positioned in the neighborhood of the shifting dry out point throughout the range of normal operation. Being a fixed position temperature sensor, there is no convenient way to track the shifting position of the dry out point. Thus the conventional measurement system must avoid the dry out point by establishing closed loop control at a higher superheat temperature. This is inherently inefficient, but unavoidable in the conventional approach.

Figure 4:
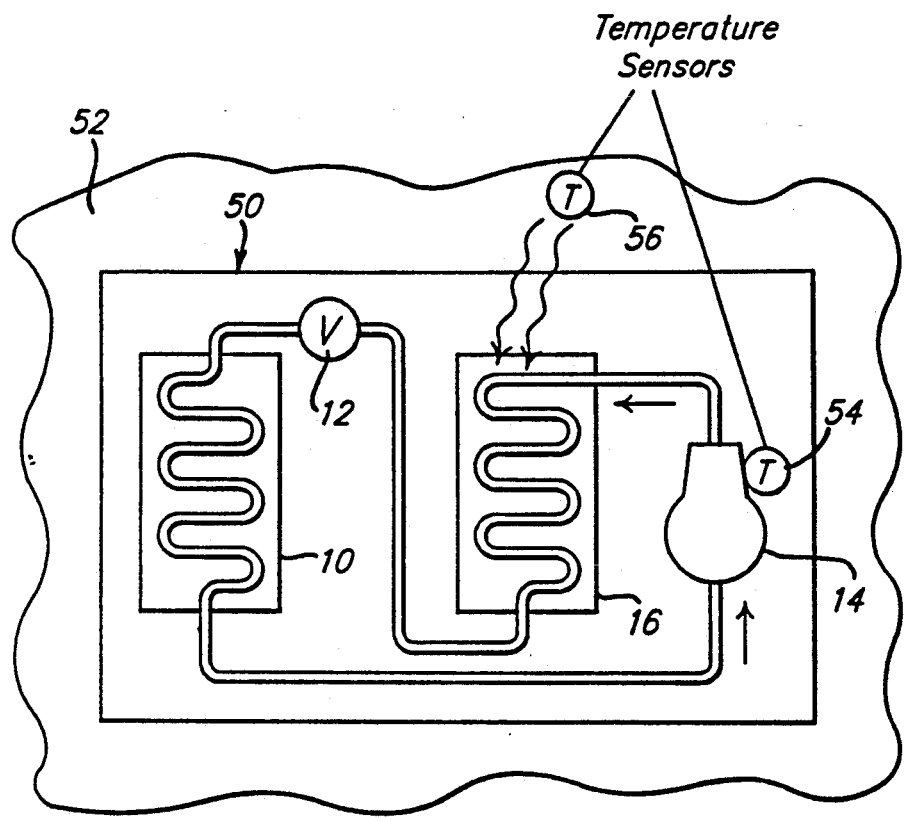
FIG. 4 is a diagrammatic view illustrating the decoupled sensor arrangement utilized by the invention.
Figure 5:
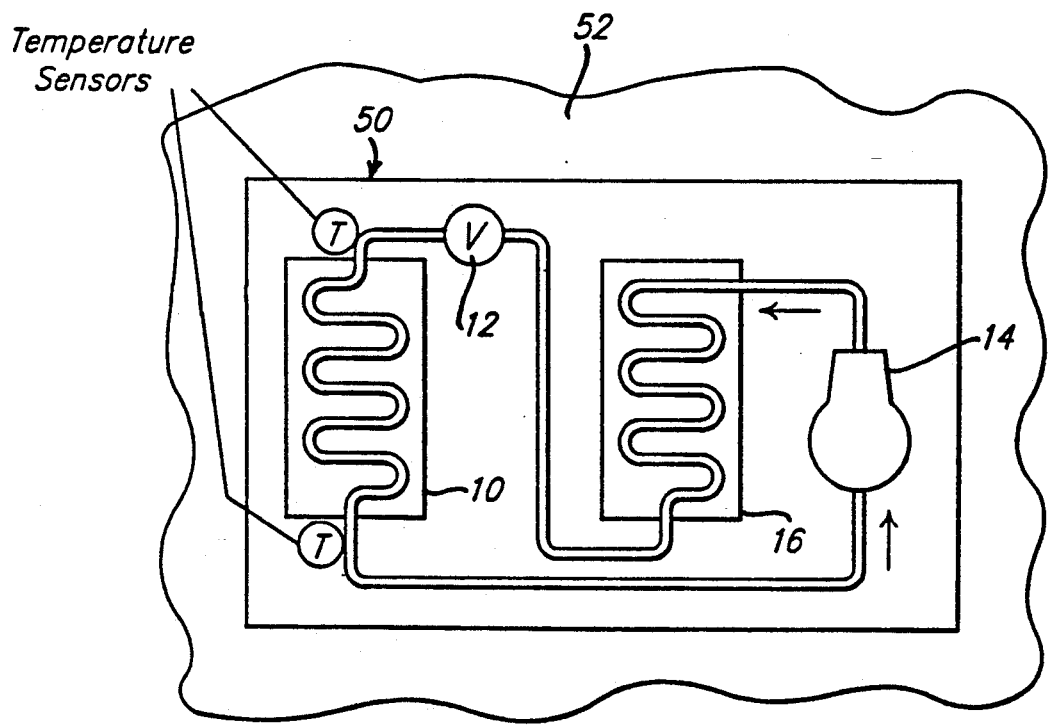
FIG. 5 is a schematic representation similar to that of FIG. 4, representing the prior art temperature sensor arrangement.

The control system of the invention avoids this inherent unpredictability by basing its measurements on phenomena which are not readily influenced by the shifting dry out point. More specifically, the present system uses a first temperature sensor which gives an indication of the operating temperature of the system, and a second temperature sensor which gives an indication of the temperature of the environment in which the system is situated. This is illustrated in FIG. 4. For comparison purposes the conventional prior art control system is illustrated in FIG. 5. Both FIGS. 4 and 5 depict a refrigeration system 50 situated in an environment 52. Both refrigeration systems have an evaporator coil 10, expansion valve 12, compressor 14 and condenser coil 16. As diagrammatically illustrated, the first temperature sensor 54 of the invention (FIG. 4) is positioned in the refrigeration system 50, but the second temperature sensor 56 is positioned in the environment 52 so that it is effectively decoupled from the refrigeration system 50. In contrast, the temperature sensors of the conventional prior art system (FIG. 5) are both situated in the refrigeration system (i.e., on opposite ends of the evaporator coil 10).

As shown in FIG. 2 (and also in FIG. 4) in the presently preferred embodiment the first temperature sensor 54 is positioned to measure the discharge temperature of the pressurized refrigerant as it leaves the compressor. Other sensor placements could have been chosen, but this preferred temperature placement gives accurate repeatable results which can be in part attributed to the fact that the compressor discharge temperature fluctuations are relatively well dampened from temperature disturbances caused by any shifting of dry out point.

The second temperature sensor 56 is preferably positioned in an airflow path which will measure the temperature of the ambient air surrounding or forced across the condenser coil 16. The ambient air temperature provides a stable reference temperature which is, for all practical purposes, fully isolated or decoupled from any operating perturbations in the refrigeration system.

As a result of isolating or decoupling the temperature measurement from system, the present invention is able to operate at a lower minimum stable superheat setpoint than a conventional system. In the presently preferred embodiment, the system is configured to operate at nominal superheat of 5° F. This is well within the region designated as unstable (region A) of FIG. 3. However, because the measured variables are decoupled from perturbations caused by shifting dryout point, the present invention is stable at this low superheat temperature.

Placement of this ambient air temperature sensor can be critical. In the COOLING mode, with the condenser coil located outdoors, the ambient temperature sensor should be positioned so that it will not receive direct sunlight. This may be accomplished by placing the ambient temperature sensor in a tube or enclosure which is open to airflow but shielded from the direct rays of the sun.

Figure 6:
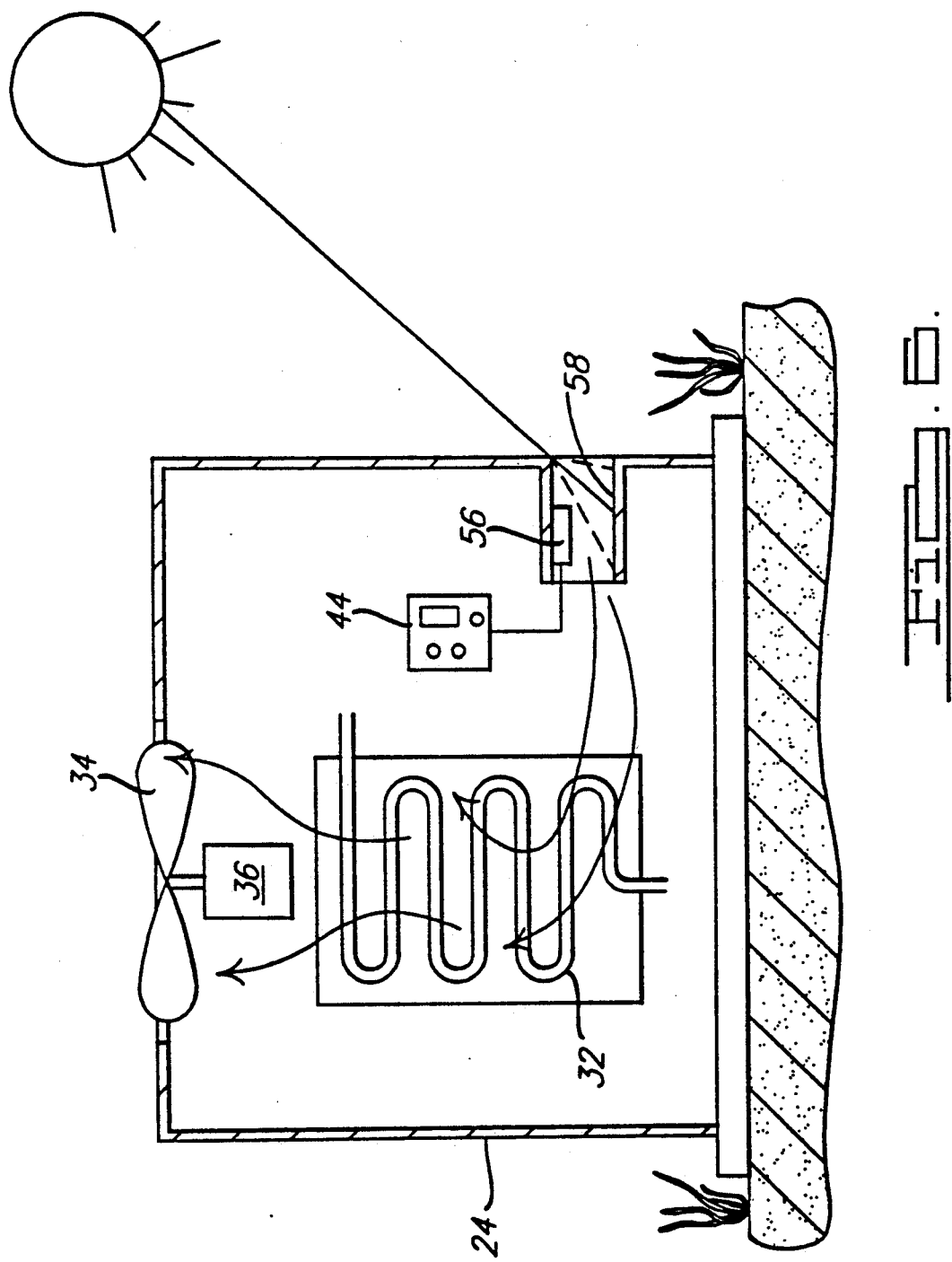
FIG. 6 is a cross-sectional view showing a preferred manner of positioning the ambient temperature sensor of the invention to reduce the effects of radiant heating.

FIG. 6 illustrates one manner of shielding the ambient temperature sensor. As illustrated, the sensor 56 is positioned within tube 58 which is mounted in the housing sidewall of the outdoor unit 24. The tube shields sensor 56 from the direct rays of the sun, as shown, but is open to the atmosphere and to the interior of the housing so that ambient air will flow across sensor 56 under force of outdoor fan 34. The moving airflow produced by fan 34 virtually negates any radiant and conductive heating effects caused by heating of the housing by the sun's radiant energy. The result is an accurate measurement of the ambient air temperature which will be drawn by fan 34 across outdoor coil 32.

In the HEATING mode the ambient air temperature sensor measures the air temperature flowing across the indoor coil. Thus the temperature sensor 60 within the system thermostat can be used to provide this signal if desired. Usually it is not necessary to be concerned with placement of the indoor air temperature sensor, since the system thermostat is usually positioned where it will not be unduly affected by direct sunlight. Although the system thermostat will usually adequately serve as the environment sensor for HEATING mode operation, if desired a separate temperature sensor could be placed in the air return ductwork to measure the temperature of the ambient air delivered across the indoor coil 26.

Although the compressor discharge temperature and the ambient air temperature do not directly yield a value equal to the superheat, they do yield a value indicative of the superheat. This is so because the superheat, the difference between the refrigerant saturation temperature and the elevated vapor temperature, is ultimately dictated by the temperature within the system (e.g., the compressor discharge temperature) and the environment which is placing thermal demands on the system. Indeed, the purpose of determining the superheat temperature is to obtain an indicator for proper setting of the expansion valve orifice. It has been found that the use of one system indicating temperature and one environment indicating temperature (e.g., compressor discharge temperature and ambient air temperature) gives better results, more accurate and repeatable, than is achieved by conventional systems which rely on two system dependent temperatures.

Figure 7:
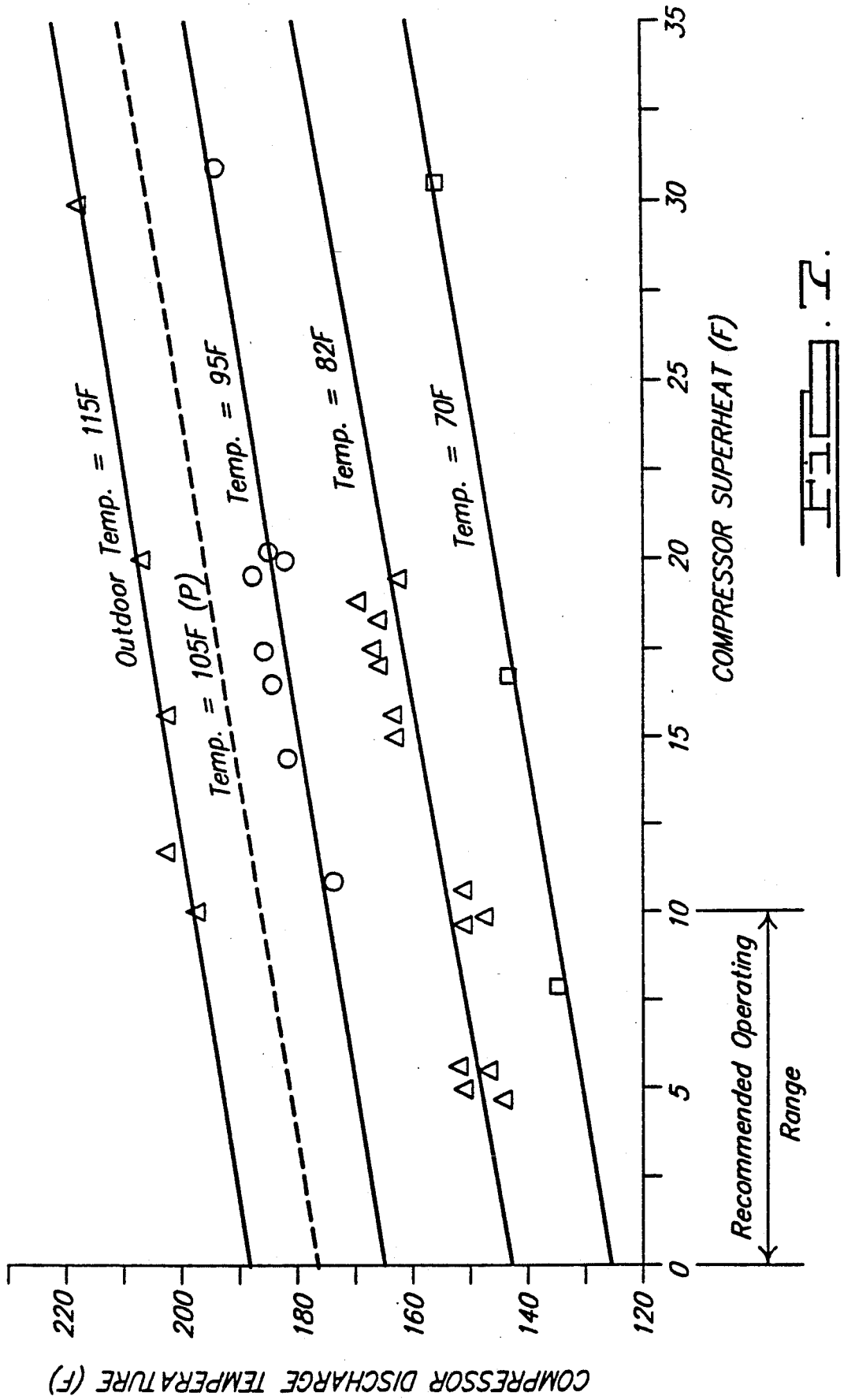
FIG. 7 is a graph depicting the relationship between compressor discharge temperature and compressor superheat for various outdoor temperatures and the recommended operating range for superheat for maximum system efficiency.
Figure 8:
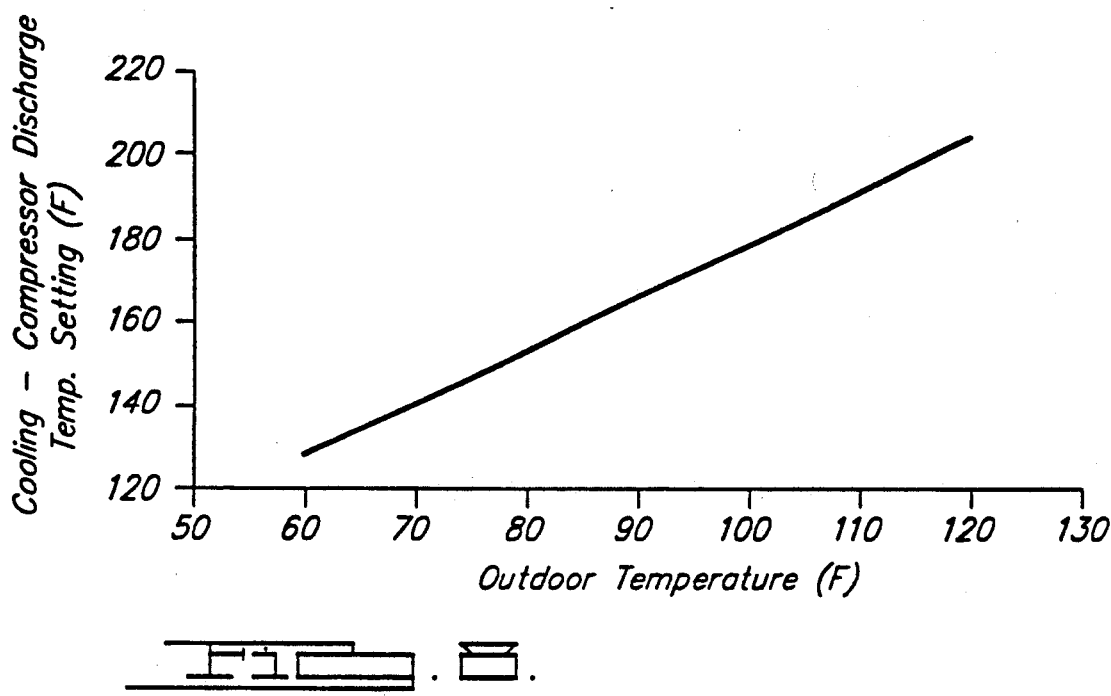
FIG. 8 is a graph depicting the relationship between compressor discharge temperature and outdoor air temperature for the COOLING mode.
Figure 9:
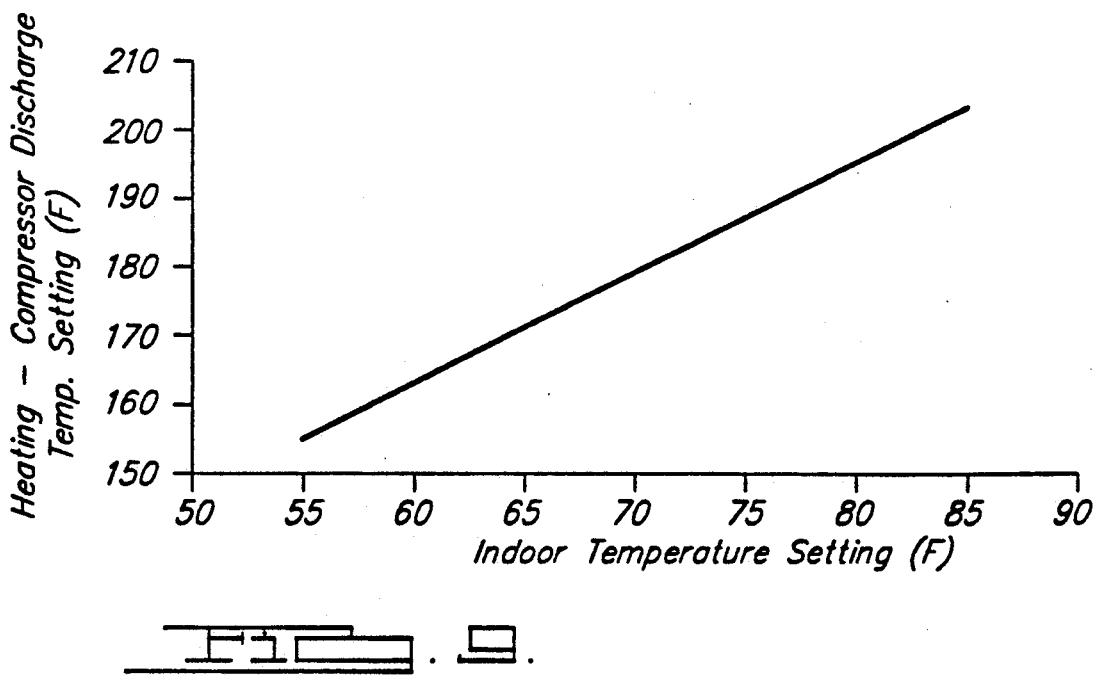
FIG. 9 is a graph depicting the relationship between compressor discharge temperature and indoor air temperature for the HEATING mode.

In order to translate the system temperature and ambient temperature measurements into the proper expansion valve setting, a calculated algorithm or lookup table may be used. The presently preferred embodiment uses a straight line or first order equation of the form $y = mx + b$ in order to map the measured ambient temperatures onto the compressor discharge temperature setting. This is depicted graphically in FIGS. 8 and 9. The relationship between superheat ($\Delta T$) and the compressor discharge setting may be calculated based upon empirical values for m, the slope of the line and b, the y-axis intercept. These empirical values will vary from system to system and are determined by conducting simple temperature measurements of an exemplary system over the normal operating range of temperatures for different ambients. Ideally, data points representing the most efficient operation will be selected. FIG. 7 shows data of an exemplary system with an indication of the presently preferred or recommended operating range. Once sufficient data points are measured to construct a straight line graph, similar to that of FIG. 8 and 9, the slope m and y-axis intercept b can be determined and thereafter used to compute the proper system temperature set point based on ambient measurements.

The presently preferred embodiment favors a first order calculation approach over a lookup table approach. In most implementations the stepper motor valve setting will be updated at a rate which is easily accommodated by the calculation approach. Of course, in applications where the valve must be controlled on a more frequent basis or in cases where a straight line approximation is not adequate, a lookup table approach may be preferred.

The valve setting, is an indirect function of the superheat (ΔT), representing a desired steady state target setting. Ordinarily the valve setting will need to be updated from time to time, but not continuously. The presently preferred control system uses a modified integral control algorithm to control the way the expansion valve setting is changed over time to respond to system demands. The valve setting is updated at a rate or frequency based on outdoor temperature. Valve settings are updated in increments or steps based on the difference or error between actual set point temperature and the calculated setting determined by the y=mx+b calculation described above.

Figure 10:
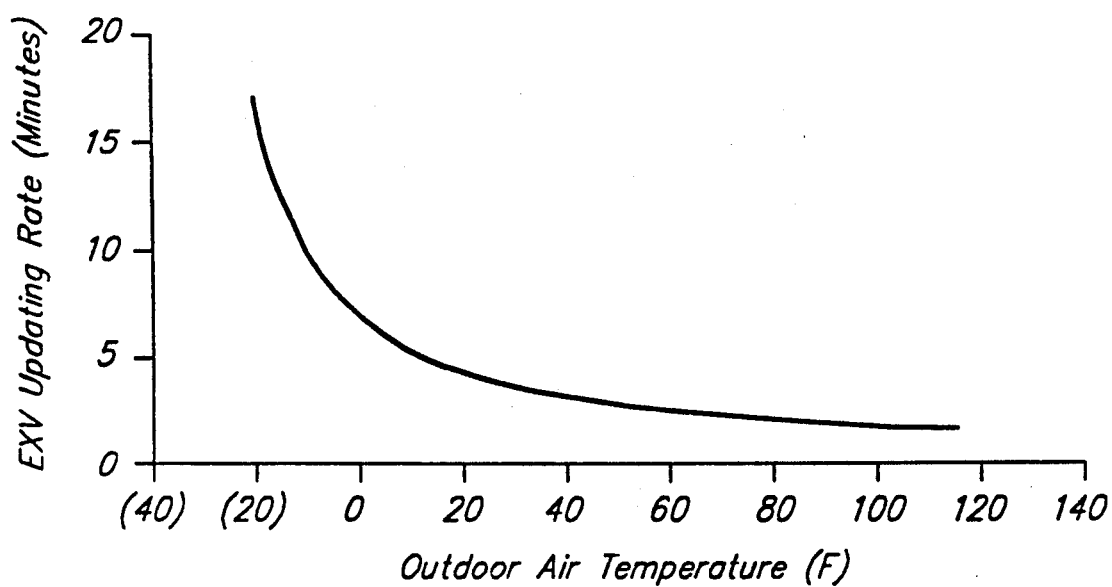
FIG. 10 is a graph illustrating the presently preferred valve setting update rate as a function of outdoor temperature.

FIG. 10 shows the presently preferred valve setting update rate or schedule as it varies with outdoor temperature. From the curve of FIG. 10, an inverse relationship is established between valve update rate (in minutes) and outdoor air temperature. The valve setting is updated more frequently when the outdoor temperature is high, and less frequently when the outdoor temperature is low necessitated by the response time of the system at different outdoor tempertures.

Figure 11:
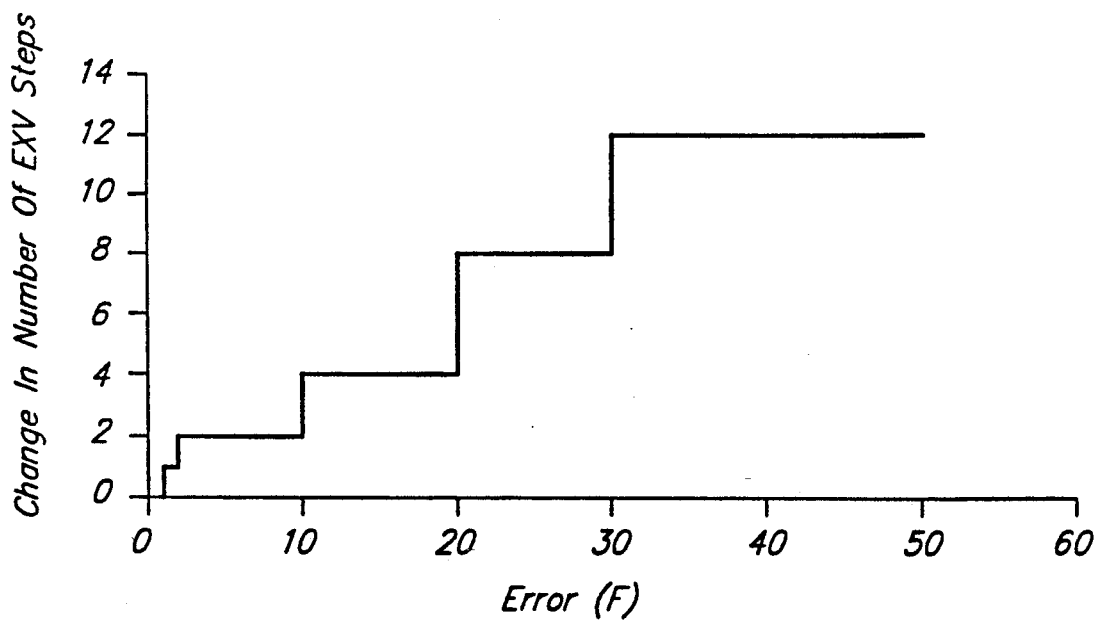
FIG. 11 is a graph depicting the presently preferred manner in which valve setting is changed in steps or increments based on temperature error.

FIG. 11 shows the presently preferred manner in which the valve setting is changed in steps or increments based on the difference or error between actual system temperature and desired temperature. Recall that the presently preferred expansion valve is a stepper motor valve. As such, it is capable of being adjusted in discrete increments or steps. As shown by the curve in FIG. 11, when the error is small, the valve is changed in small steps (e.g. one or two steps for errors less than 10° F.). When the error is great, the valve is changed in large steps (e.g. four steps at a time for errors between 10° F. to 20° F.; eight steps at a time for errors between 20° F. to 30° F.; and twelve steps at a time for errors above 30° F.).

From the foregoing, it will be seen that the present invention represents a significant departure from conventional refrigeration cycle control techniques. Through the use of decoupled temperature measurements (compressor discharge temperature and ambient air temperature) the heat pump or air conditioning cycle can be controlled to a degree not previously achieved. The system can be operated in a lower minimum superheat regime, unreachable by conventional systems, and at higher efficiency than previously achieved.

While the invention has been described with respect to a presently preferred heat pump embodiment, it will of course be understood that the invention can be applied to numerous forms of air conditioning systems and refrigeration systems. Accordingly, the principles of the invention are not limited to the embodiment described. The invention is capable of certain modification and change without departing from the spirit of the invention as set forth in the appended claims.

What is claimed is:

1. A method of controlling a refrigeration cycle of a heat pumping system of the type having an indoor heat exchanger and an outdoor heat exchanger and having an expansion valve for delivering refrigerant into the indoor heat exchanger to extract heat from the environment in which the heat pumping system is situated, the heat pumping system further having a compressor for processing the refrigerant after it has extracted heat in the indoor heat exchanger and discharging the refrigerant at an elevated pressure, comprising the steps of:
   measuring a first parameter indicative of the temperature of the refrigerant discharged from the compressor within the heat pumping system;
   measuring a second parameter indicative of the temperature of the environment in which the outdoor heat exchanger is situated;
   using the first and second parameters to control the expansion valve to thereby control the metering of refrigerant delivered to the indoor heat exchanger.

2. The method of claim 1 wherein said heat pumping system is of the type of in which the outdoor heat exchanger is a condenser for processing the refrigerant before it is introduced through the expansion valve to the indoor heat exchanger,
   wherein the step of measuring the second parameter is performed by measuring the temperature of the ambient air in the vicinity the condenser.

3. A control system for controlling the metering of refrigerant in a heat pumping system of the type having an indoor heat exchanger and an outdoor heat exchanger and having an expansion valve for delivering refrigerant into the indoor heat exchanger to extract heat from the environment in which the heat pumping system is situated, the heat pumping system further having a compressor for processing the refrigerant after it has extracted heat in the indoor heat exchanger and for discharging the refrigerant at an elevated pressure, comprising:
   first sensor means thermally coupled to said heat pumping system for measuring the discharge temperature of the refrigerant discharged from the compressor;
   second sensor means thermally decoupled from said heat pumping system for measuring a second parameter indicative to the temperature of the environment in which the outdoor heat exchanger is situated;
   processor means electrically coupled to said first and second sensor means and to said expansion valve for controlling said valve based on said first and second parameters to control the metering of refrigerant delivered to the indoor heat exchanger.

4. The control system of claim 3 wherein said outdoor heat exchanger comprises a condenser means for processing the refrigerant before it is delivered by said expansion valve into said evaporator,
   wherein said second sensor comprises a temperature sensor for measuring the temperature of the ambient air in the vicinity of said condenser means.

5. The control system of claim 3 wherein said heat pumping system includes a user settable thermostat.

6. A system for controlling the metering of refrigerant in a heat pumping system of the type which employs a refrigerant circuit through which refrigerant is pumped to extract heat from the environment at a first location and to discharge heat into the environment at a second location, the heat pumping system including a first heat exchanger disposed at said first location, a second heat exchanger disposed at said second location, and a compressor for pressurizing the refrigerant and inducing the refrigerant to flow through said circuit, comprising:
   reversing valve means coupled to said compressor and to said first and second heat exchangers for selectively changing state between a HEATING mode in which the flow of refrigerant is directed from said first heat exchanger to said second heat exchanger and a COOLING mode in which the flow of refrigerant is directed from said second heat exchanger to said first heat exchanger;

expansion valve means coupled between said first and second heat exchangers for metering the flow of refrigerant between said heat exchangers;

first sensor means thermally decoupled from said heat pumping system for measuring a first parameter indicative of the temperature of the environment at said first location;

second sensor means thermally decoupled from said heat pumping system for measuring a second parameter indicative of the temperature of the environment at said second location;

third sensor means thermally coupled to said heat pumping system for measuring a third parameter indicative of the temperature of the refrigerant;

processor means electrically coupled to said first, second and third sensor means and to said expansion valve for controlling said expansion valve as follows:

in said HEATING mode, controlling said expansion valve based on said first and third parameters to control the metering of refrigerant delivered to the second heat exchanger;

in said COOLING mode, controlling said expansion valve based on said second and third parameters to control the metering of refrigerant delivered to the first heat exchanger.

7. The system of claim 6 wherein said first sensor means comprises a temperature sensor for measuring the temperature of the ambient air in the vicinity of said first heat exchanger.

8. The system of claim 6 wherein said second sensor means comprises a temperature sensor for measuring the temperature of the ambient air in the vicinity of said second heat exchanger.

9. The system of claim 6 wherein said first sensor is a temperature sensor associated with a user settable thermostat.

10. The system of claim 6 wherein said third sensor is a temperature sensor thermally coupled to the refrigerant circuit in the proximity of said compressor.

11. The system of claim 6 wherein said third sensor is a temperature sensor thermally coupled to measure the discharge temperature of the refrigerant discharged from said compressor.

* * * * *

UNITED STATES PATENT AND TRADEMARK OFFICE
CERTIFICATE OF CORRECTION

PATENT NO. : 5,311,748
DATED : May 17, 1994
INVENTOR(S) : Vijay Bahel; Hank Millet; Mickey Hickey; Hung Pham; Gregory P. Herroon It is certified that error appears in the above-indentified patent and that said Letters Patent is hereby corrected as shown below:

On the title page under U.S. Patent Documents, reference 4,448,038, "Barbler" should be — Barbier —.

Column 9, line 24, "tempertures" should be — temperatures —.

Column 10, line 13, delete "of" (second occurrence).

Column 10, line 19, after "vicinity" insert — of —.

Signed and Sealed this

Twenty-fifth Day of October, 1994

Attest:

BRUCE LEHMAN

Attesting Officer        Commissioner of Patents and Trademarks